US009460541B2

United States Patent
Li et al.

(10) Patent No.: US 9,460,541 B2
(45) Date of Patent: Oct. 4, 2016

(54) AVATAR ANIMATION, SOCIAL NETWORKING AND TOUCH SCREEN APPLICATIONS

(71) Applicant: Intel Corporation, Santa Clara, CA (US)

(72) Inventors: Wenlong Li, Beijing (CN); Xiaofeng Tong, Beijing (CN); Yangzhou Du, Beijing (CN); Thomas Sachson, Menlo Park, CA (US); Yunzhen Wang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 478 days.

(21) Appl. No.: 13/997,259

(22) PCT Filed: Mar. 29, 2013

(86) PCT No.: PCT/CN2013/000368
§ 371 (c)(1),
(2) Date: Jun. 22, 2013

(87) PCT Pub. No.: WO2014/153689
PCT Pub. Date: Oct. 2, 2014

(65) Prior Publication Data
US 2016/0005206 A1    Jan. 7, 2016

(51) Int. Cl.
*G06T 13/80* (2011.01)
*H04N 7/15* (2006.01)
*G06T 13/40* (2011.01)
(Continued)

(52) U.S. Cl.
CPC ............ *G06T 13/80* (2013.01); *G06K 9/00268* (2013.01); *G06T 7/20* (2013.01); *G06T 13/40* (2013.01); *G09G 5/003* (2013.01);
(Continued)

(58) Field of Classification Search
USPC .................................................. 345/473, 474
See application file for complete search history.

(56) References Cited

U.S. PATENT DOCUMENTS

| 5,880,731 A | 3/1999 | Liles et al. |
| 6,313,864 B1 | 11/2001 | Tabata et al. |

(Continued)

FOREIGN PATENT DOCUMENTS

| CN | 1532775 A | 9/2004 |
| CN | 1972274 A | 5/2007 |

(Continued)

OTHER PUBLICATIONS

Augustine, "SOEmote implants your facial expressions, movement, and voice onto your EQ2 avatar," Jun. 1, 2012. Retrieved at: http://www.pcgamer.com/2012/06/01/soemote-implants-your-facial-expressions-movement-and-voice-onto-your-eq2-avatar/#null on, 16 pages.

(Continued)

*Primary Examiner* — Kimbinh T Nguyen
(74) *Attorney, Agent, or Firm* — Jordan IP Law, LLC

(57) ABSTRACT

Systems and methods may provide for detecting a condition with respect to one or more frames of a video signal associated with a set of facial motion data and modifying, in response to the condition, the set of facial motion data to indicate that the one or more frames lack facial motion data. Additionally, an avatar animation may be initiated based on the modified set of facial motion data. In one example, the condition is one or more of a buffer overflow condition and a tracking failure condition.

23 Claims, 8 Drawing Sheets

(51) Int. Cl.
- *G06K 9/00* (2006.01)
- *G06T 7/20* (2006.01)
- *G09G 5/00* (2006.01)
- *H04N 7/14* (2006.01)

(52) U.S. Cl.
CPC ....... *H04N 7/157* (2013.01); *G09G 2370/022* (2013.01); *H04N 2007/145* (2013.01)

(56) References Cited

U.S. PATENT DOCUMENTS

| | | | |
|---|---|---|---|
| 6,580,811 B2 | 6/2003 | Maurer et al. | |
| 7,076,118 B1 | 7/2006 | Westerman | |
| 8,963,926 B2* | 2/2015 | Brown | G06T 13/20 345/473 |
| 9,003,461 B2* | 4/2015 | Perlman | A63F 13/12 725/115 |
| 2007/0065039 A1 | 3/2007 | Park et al. | |
| 2007/0188502 A1* | 8/2007 | Bishop | G06T 13/40 345/473 |
| 2007/0201730 A1 | 8/2007 | Masaki et al. | |
| 2007/0230794 A1 | 10/2007 | McAlpine et al. | |
| 2007/0260984 A1* | 11/2007 | Marks | A63F 13/06 715/706 |
| 2008/0059570 A1 | 3/2008 | Bill | |
| 2009/0055484 A1 | 2/2009 | Vuong et al. | |
| 2010/0156781 A1 | 6/2010 | Fahn | |
| 2010/0189354 A1 | 7/2010 | de Campos et al. | |
| 2011/0085139 A1 | 4/2011 | Blixt et al. | |
| 2011/0131041 A1* | 6/2011 | Cortez | G06T 13/205 704/235 |
| 2011/0248992 A1* | 10/2011 | van Os | G06T 11/60 345/419 |
| 2011/0304629 A1* | 12/2011 | Winchester | G06T 13/40 345/473 |
| 2012/0130717 A1* | 5/2012 | Xu | G06T 13/40 704/258 |
| 2012/0206558 A1 | 8/2012 | Setton | |
| 2013/0109302 A1 | 5/2013 | Levien et al. | |
| 2013/0235045 A1* | 9/2013 | Corazza | G06K 9/00315 345/473 |
| 2013/0257876 A1* | 10/2013 | Davis | G06T 13/80 345/473 |
| 2013/0257877 A1* | 10/2013 | Davis | G06T 13/80 345/473 |
| 2013/0293584 A1 | 11/2013 | Anderson | |
| 2014/0055554 A1 | 2/2014 | Du et al. | |
| 2014/0218459 A1 | 8/2014 | Wenlong et al. | |

FOREIGN PATENT DOCUMENTS

| | | |
|---|---|---|
| CN | 101472158 A | 7/2009 |
| CN | 102054287 A | 5/2011 |
| CN | 102087750 A | 6/2011 |
| CN | 102479388 A | 5/2012 |
| CN | 104115503 A | 10/2014 |
| WO | 2013097139 A1 | 7/2013 |
| WO | 2013097264 A1 | 7/2013 |

OTHER PUBLICATIONS

Li et al., "Communication Using Avatar", International Patent Application No. PCT/CN2011/084902, filed on Dec. 29, 2011, 21 pages.

International Search Report and Written Opinion received for PCT Patent Application No. PCT/CN2013/000368, mailed on Jan. 9, 2014, 10 pages.

International Search Report for PCT application PCT/CN2011/084902, dated Oct. 18, 2012, 3 pages.

International Search Report for PCT application PCT/CN2012/000461, dated Oct. 4, 2012, 3 pages.

Written Opinion of the International Searching Authority for PCT application PCT/CN2011/084902, dated Oct. 18, 2012, 4 pages.

Written Opinion of the International Searching Authority for PCT application PCT/CN2012/000481, dated Oct. 4, 2012, 5 pages.

* cited by examiner

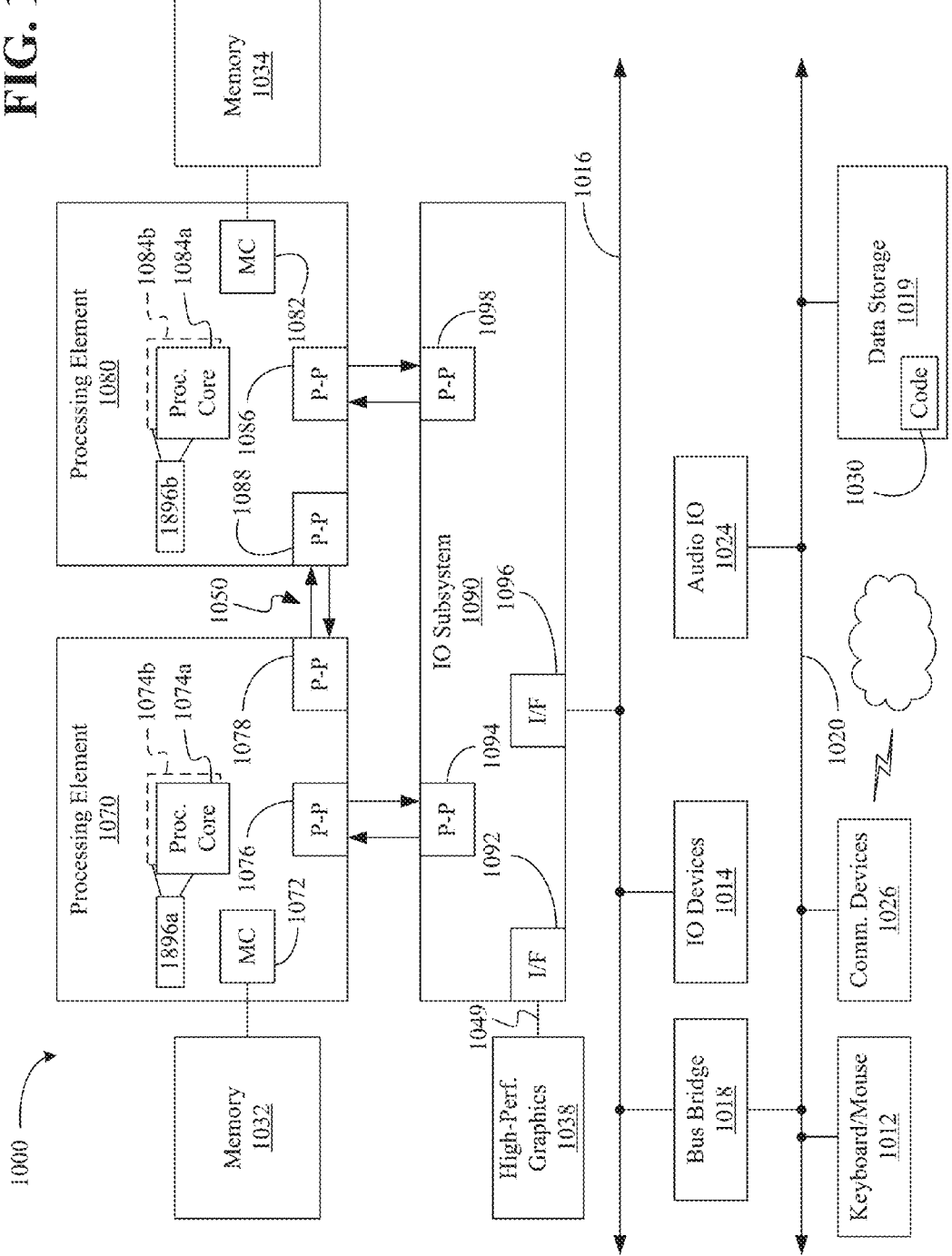

AVATAR ANIMATION, SOCIAL NETWORKING AND TOUCH SCREEN APPLICATIONS

TECHNICAL FIELD

Embodiments generally relate to avatars. More particularly, embodiments relate to animating avatars on mobile devices and in social networking settings.

BACKGROUND

Avatars may be used in virtual worlds such as game environments. Recent developments in avatar technology may leverage high performance processing resources to animate avatars in response to the facial expressions of a user. The application of such technology to mainstream smart phones, however, may result in missed facial expressions and a poor user experience due to insufficient processing power. Moreover, these performance-related challenges may constrain the extension of avatar animation to certain smart phone-based applications.

BRIEF DESCRIPTION OF THE DRAWINGS

The various advantages of the embodiments will become apparent to one skilled in the art by reading the following specification and appended claims, and by referencing the following drawings, in which:

FIG. 10 is a block diagram of an example of a system according to an embodiment.

DESCRIPTION OF EMBODIMENTS

Figure 1:
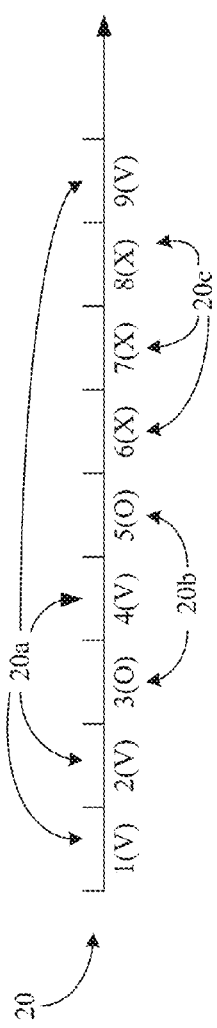
FIG. 1 is an illustration of a video signal having frames with a buffer overflow condition and a tracking failure condition according to an embodiment.

Turning now to FIG. 1, an illustration of a plurality of frames 20 (20a-20c) is shown for a video signal, wherein the frames 20 may generally correspond to the image capture of the face of one or more individuals/subjects for the purposes of generating an avatar animation. In the illustrated example, facial motion data is successfully extracted from a first set of frames 20a (e.g., annotated with a "V"). The facial motion data may include various parameters that represent facial features and/or expressions such as, for example, the position of an individual's eyes, mouth, cheeks, teeth, eyebrows, etc., head turns, nods, blinks, frowns, smiles, winks, and so forth. Thus, the facial motion data for the first set of frames 20a may result from the successful identification of an individual's face in the video signal and the recognition of one or more facial features and/or expressions with respect to the identified face.

Facial motion data for other frames, however, may be unavailable for a number of reasons. For example, a second set of frames 20b (e.g., annotated with an "O"), may be dropped prior to successful completion of facial processing, due to a buffer overflow condition. Thus, if the buffer used to store the frames 20 is full and frame "4(V)" arrives at the buffer before the processing of frame "3(O)" has been completed, frame 3(O) may be dropped, resulting in a lack of facial motion data for frame 3(O). Of particular note is that such a condition may be more prevalent on a mainstream mobile device such as a low performance smart phone and/or smart tablet due to limited/slower processing capability.

Similarly, a third set of frames 20c (e.g., annotated with an "X"), may be unsuccessfully processed due to a tracking failure condition. For example, poor lighting conditions and/or the individual's face being out of the field of view might lead to such a tracking failure condition. Tracking failure conditions may also be prevalent in smart phone and/or smart tablet settings due to the handheld nature of those devices and difficulty in capturing proper poses.

As will be discussed in greater detail, nearby frames with facial motion data may be leveraged to compute replacement facial motion data for frames having buffer overflow conditions, tracking failure conditions, and so forth. For example, if the facial motion data of frame "2(V)" indicates that the user's eye is closed, and the facial motion data of frame "4(V)" indicates that the user's eye is open, the replacement facial motion data of frame "3(O)" for the user's eye might be set to 50% as part of a smoothing and/or linear interpolation process. A similar approach may be used for frames subject to poor lighting and/or other tracking failure conditions. As will be discussed in greater detail, the facial motion data described herein may be used to generate avatar animations.

Figure 2:
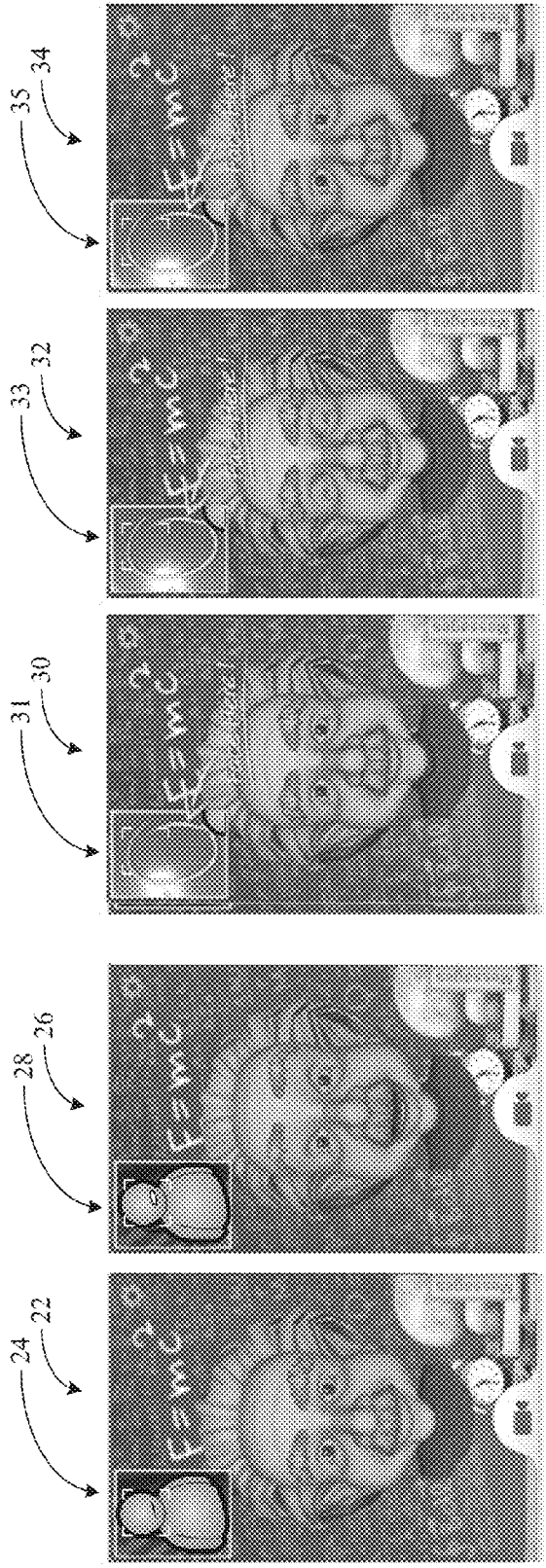
FIG. 2 is an illustration of a set of avatar animations that are driven by facial expressions according to an embodiment.

FIG. 2 shows a set of avatar animations under various conditions. For example a first avatar animation 22 may result from a successful extraction of facial motion data from a frame 24 in which the user's face is properly positioned within the image capture area of the camera. A second avatar animation 26 may also result from a successful extraction of facial motion data from a frame 28 in which the user face is smiling and is properly positioned within the image capture area of the camera. The avatar animation 26 mimics the smile of the user, in the illustrated example.

Other frames such as frames 31, 33 and 35, however, may be obtained while the user is outside the capture area of the camera. As already noted, replacement facial motion data may be generated for the frames 31, 33 and 35, so that their corresponding avatar animations 30, 32 and 34, respectively, may mimic the facial expressions of the user even when a failed tracking condition exists. Indeed, even for a number of consecutive frames with no facial motion data, the avatar may continue to be animated. More particularly, the eyes of the illustrated avatar animation 32 are closed even though the frame 33 exhibits a failed tracking condition. Similar results for poor lighting conditions and buffer overflow frames may be obtained.

Figure 3:
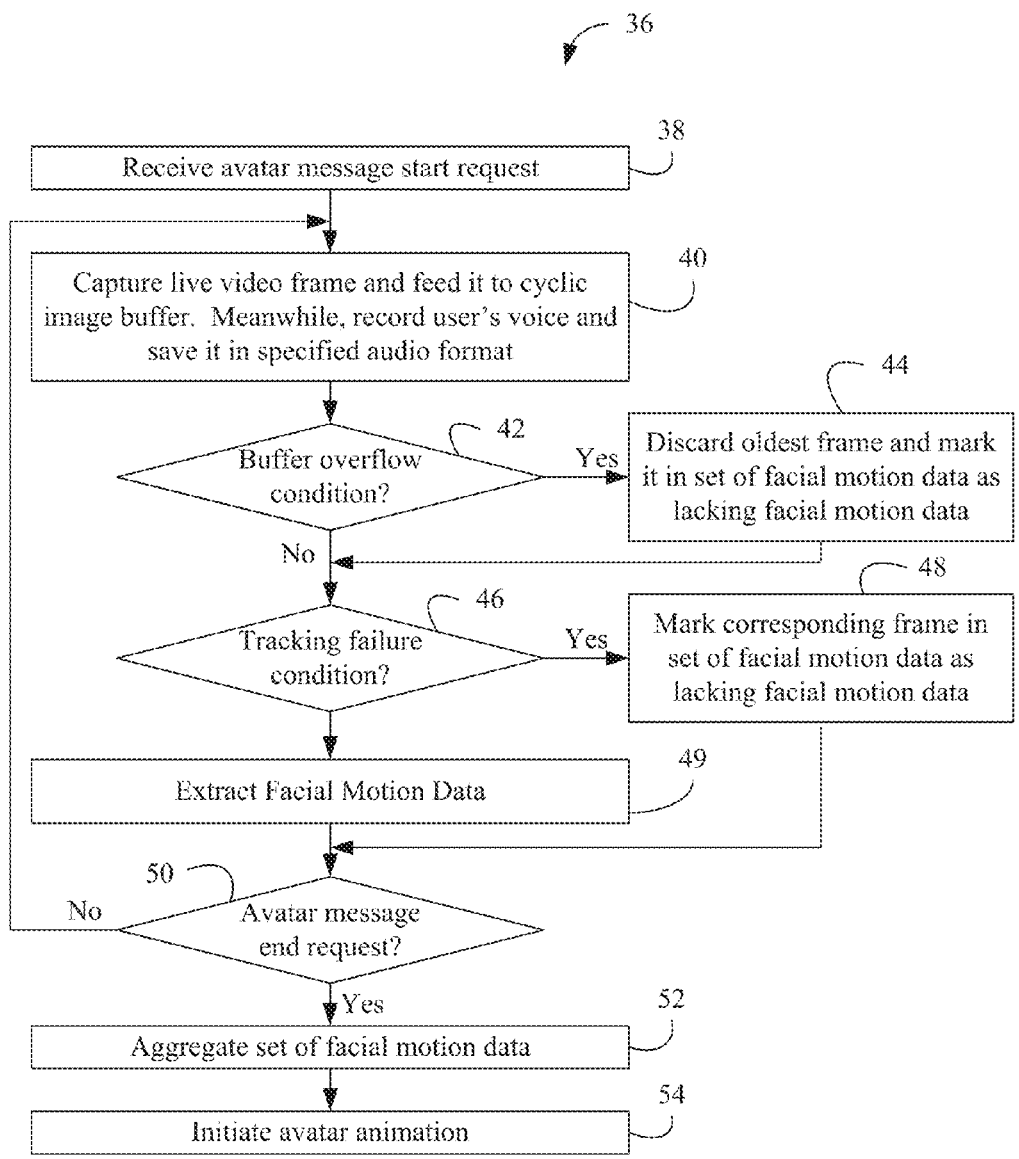
FIG. 3 is a flowchart of an example of a method of using a set of facial motion data to initiate an avatar animation according to an embodiment.

Turning now to FIG. 3, a method 36 of using a set of facial motion data to initiate an avatar animation is shown. The method 36 may be implemented in a client device as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 36 may be written in any combination of one or more programming languages, including an object oriented programming language such as C++ or the like and conventional procedural programming languages, such as the "C" programming language or similar programming languages. Moreover, the method 36 may be implemented using any of the aforementioned circuit technologies.

Illustrated processing block 38 provides for receiving an avatar message start request. The start request, which may be submitted by a user upon clicking, for example, a record button in a user interface, may reflect the user's desire to send a message that contains an avatar animation that mimics the user's own facial expressions. The message may be an email message, instant message (IM), text message, voice message, etc., or any combination thereof. Block 40 may capture a live video frame and feed it to a cyclic image buffer, while recording the user's voice and saving it in a specified audio format. Block 40 may also provide for initializing a set of facial motion data to facilitate the initiation and generation of an avatar animation.

A determination may be made at block 42 as to whether a buffer overflow condition exists with respect to the video frame (e.g., due to poor lighting conditions, subject out of target capture area, etc.). If so, the oldest frame in the cyclic image buffer may be discarded at block 44 and marked in the set of facial motion data as lacking facial motion data. Thus, block 44 might involve marking a frame such as one or more of the frames in the second set of frames 20b (FIG. 1), already discussed, as lacking facial motion data. The marking process may be conducted by setting facial motion data corresponding to the frame in question to zero, or otherwise indicating that the frame in question lacks facial motion data. Simply put, illustrated block 44 modifies the set of facial motion data to indicate that one or more frames lack motion data in response to the buffer overflow condition.

A determination may also be made at block 46 as to whether a tracking failure condition exists with respect to the video frame. If so, the corresponding frame may be marked at block 48 in the set of facial motion data as lacking facial motion data. Thus, block 48 may involve marking a frame such as one or more of the frames in the third set of frames 20c (FIG. 1), already discussed, as lacking facial motion data. The marking process may again be conducted by setting facial motion data corresponding to the frame in question to zero, or otherwise indicating that the frame in question lacks facial motion data. Thus, illustrated block 48 modifies the set of facial motion data to indicate that one or more frames lack motion data in response to the tracking failure condition.

Additionally, block 49 may extract facial motion data from the current video frame and store the extracted facial motion data to the set of facial motion data. In one example, 32-bit floating point data may be created for each frame to describe facial motion such as mouth action, eye position, eyebrow position, and so forth. Thus, the extracted facial motion data may describe the degree of eye opening, degree of mouth opening, position of the lip, nose tip, head rotation, etc. Block 49 may therefore involve mapping the extracted facial motion data to the current video frame with an appropriate index. Illustrated block 50 determines whether an avatar message end request has been received, wherein the end request may be submitted by a user upon clicking, for example, a stop button in a user interface. If not, the illustrated process repeats for the next frame in the video signal. Otherwise, block 52 aggregates the set of facial motion data, wherein an avatar animation may be initiated at block 54 based on the modified set of facial motion data.

As will be discussed in greater detail, initiating the avatar animation may involve generating the avatar animation locally on the client device or using a remote server such as a cloud server or social networking server to generate the avatar animation. Additionally, the modified set of facial motion data may be sent, along with the audio signal captured in block 40, to the intended recipient of the avatar message, wherein the client device associated with the intended recipient may generate the avatar animation (e.g., if the recipient's client device includes the appropriate avatar animation capability).

Generating the avatar animation locally on the client device may involve applying a smoothing process to the frames indicated as lacking facial motion data to obtain replacement facial motion data. The smoothing process may include, for example, a Gaussian smoothing process, interpolation process, etc., or any combination thereof. Additionally, a plurality of avatar images may be identified based on the modified set of facial motion data and the replacement facial motion data. For example, the user may be given the opportunity to select a particular avatar from a listing of avatars, wherein each avatar has a corresponding collection of avatar images that may be mapped to various facial expressions and/or gestures. Thus, the avatar animation may be generated based on the identified plurality of avatar images.

The avatar animation may also be generated based on an audio signal associated with the video signal. For example, the user's voice recording from block 40 may be synchronized to the playback of the plurality of avatar images so that the avatar animation appears to be speaking and making the same facial expressions made by the sender of the message. The method 36 may therefore enable the generation of smooth, appealing avatar animations on low performance mobile devices even in the presence of conditions such as buffer overflow conditions and tracking failure conditions.

Social Networking

One type of application that may particularly benefit from the techniques described herein is social networking applications. For example, a common occurrence may be for friends and/or acquaintances to share photos and other content with one another in an online setting such as a social network, virtual forum, focus group, and so forth. The avatar animations already discussed may be readily applied in such settings to supplement the shared content. Thus, an avatar message recorded in a method such as the method 36 (FIG. 3) may be associated with a corresponding social networking posting and/or message, wherein buffer overflow conditions and tracking failure conditions may be obviated by modifying a set of facial motion data to reflect which video frames lack facial motion data. Obtaining replacement facial motion data for those frames may provide substantial benefits, as already discussed.

Figure 4A:
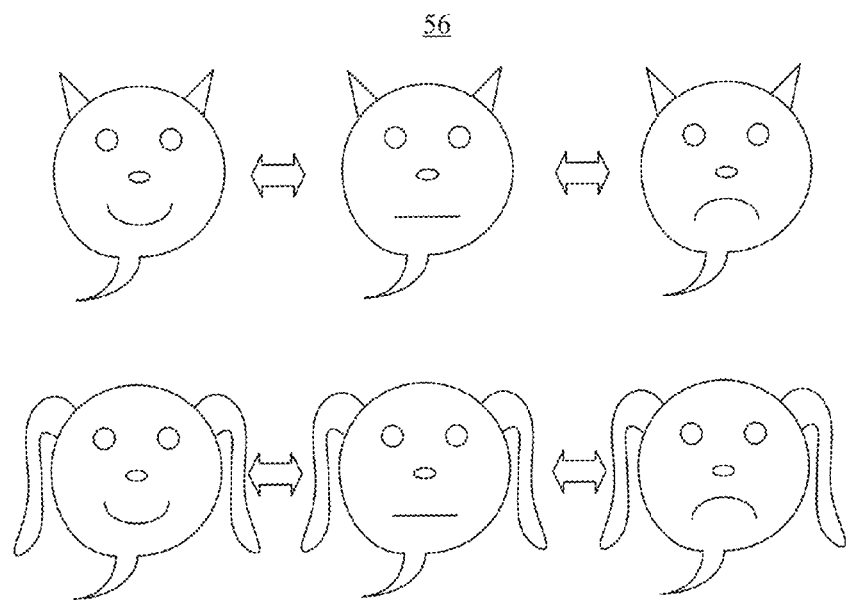
FIGS. 4A and 4B are illustrations of an example of an avatar-based social networking implementation according to an embodiment.
Figure 4B:
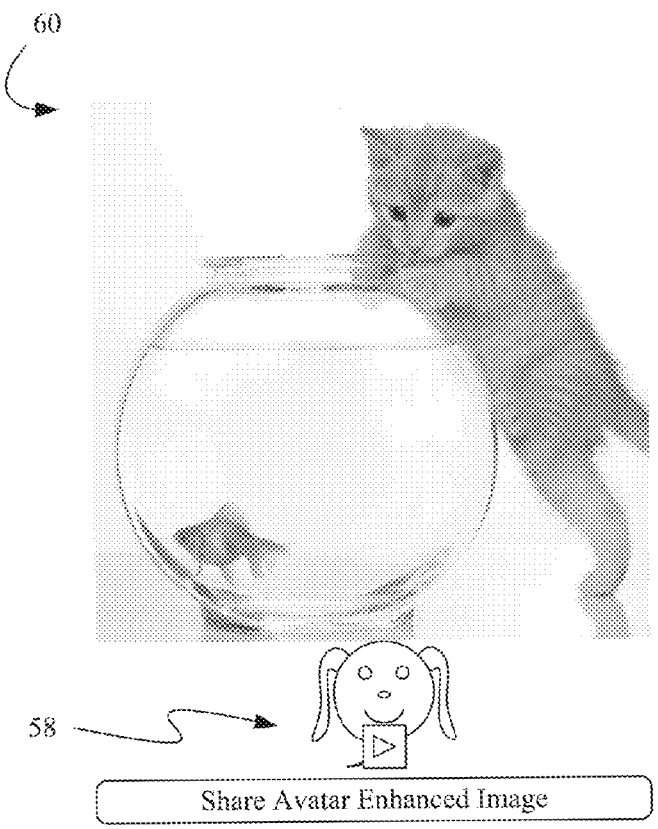

Moreover, the recorded audio may be translated into a specified avatar voice using techniques such as pitch shifting, wherein the user may establish the type of pitch shifting to be applied. For example, FIGS. 4A and 4B show an avatar-based social networking implementation in which a user interface 56 facilitates selection of an avatar and a voice tone setting for the selected avatar. As a result, the user may add an avatar animation 58 to a photo 60 that is posted and/or shared on a social networking site, wherein the avatar animation 58 is a visual and audible explanation of the photo 60. When played, the illustrated avatar animation 58 exhibits the facial expressions of the individual generating the avatar animation 58 and speaks in the specialized voice selected by the user.

Figure 5:
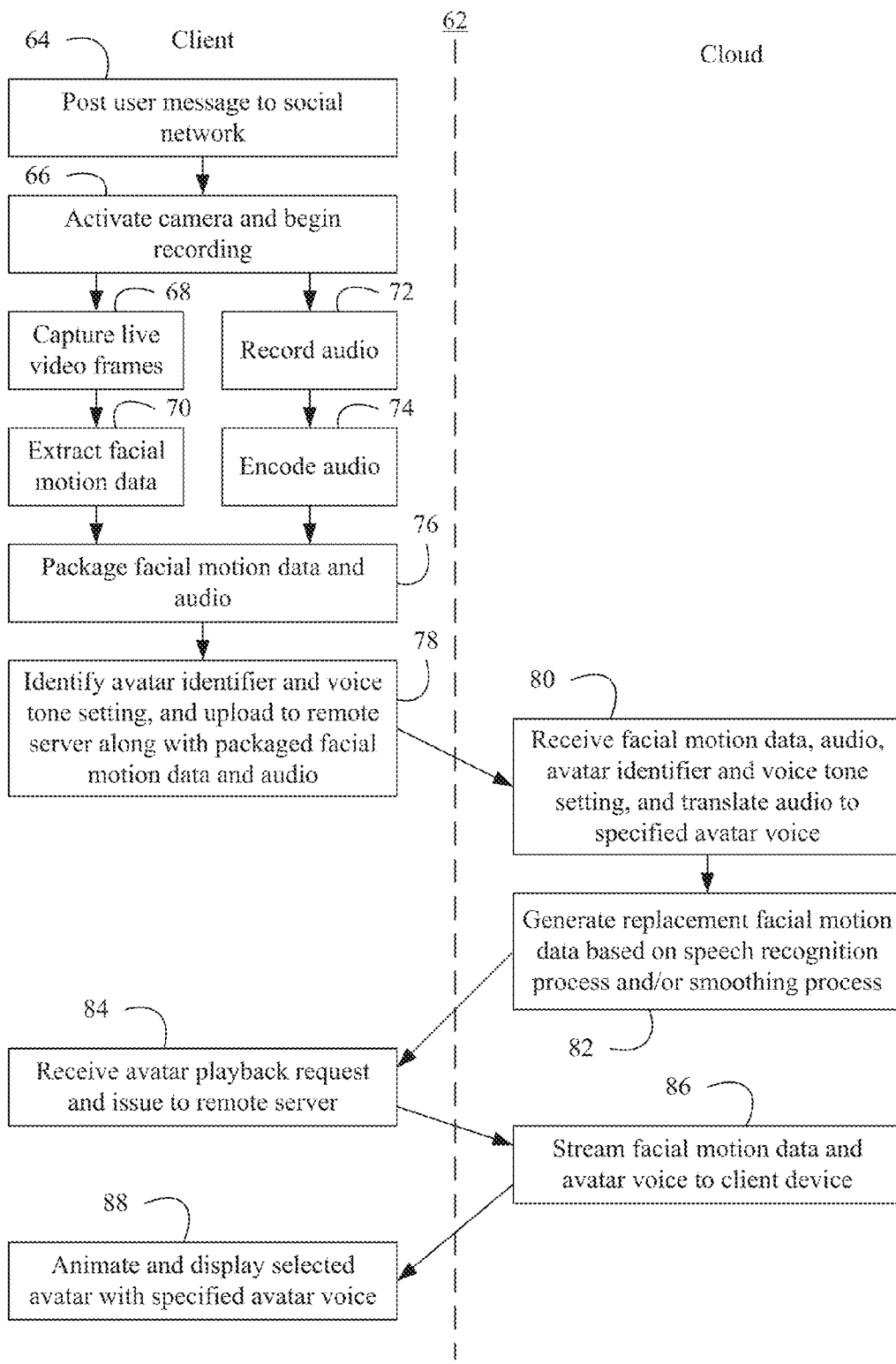
FIG. 5 is a flowchart of an example of a method of implementing an avatar-based social networking solution according to an embodiment.

Turning now to FIG. 5, a method 62 of implementing an avatar-based social networking solution is shown. The method 62 may be implemented in a client device as a set of logic instructions and/or firmware stored in a machine- or computer-readable medium such as RAM, ROM, PROM, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated client block 64 provides for posting a user message to a social network, wherein a camera may be activated at client block 66. Live video frames may be captured at client block 68 and facial motion data may be extracted from the video frames at client block 70. Meanwhile, illustrated client block 72 records an audio signal (e.g., using a microphone) and illustrated block 74 encodes the audio (e.g., via a compression process). The facial motion data and the audio may be packaged together at client block 76, wherein an avatar identifier and voice tone setting may be identified at client block 78 based on user input. Client block 78 may also provide for uploading the avatar identifier and voice tone setting to a remote server (e.g., cloud server, social networking server) along with the packaged facial motion data and audio.

Illustrated cloud block 80 receives the facial motion data, audio, avatar identifier and voice tone setting, and translates the audio into a specified avatar voice. Replacement facial motion data may be generated at block 82 based on a speech recognition process and/or smoothing process. The speech recognition process may identify certain words in the audio as involving, for example, certain degrees of mouth openness and/or certain mouth shapes.

Client block 84 may receive an avatar playback request (e.g., from the same or a different client device on which the message was recorded), wherein the playback request may be issued to the remote server. Illustrated cloud block 86 streams the facial motion data and avatar voice to the client device, and the selected avatar may be animated and played at client block 88 along with the specified avatar voice.

Touch Screen Applications

Yet another type of application that may benefit from the techniques described herein is touch screen applications. In this regard, a user may turn a touch screen enabled mobile device, such as a smart phone or smart tablet, into a recordable whiteboard. Such a solution may be particularly useful for explaining concepts (e.g., math, science, language, etc.), while employing touching, tapping, talking, etc., to create a video. Moreover, the video may be shared through email, social networking channels, and so forth.

Figure 6:
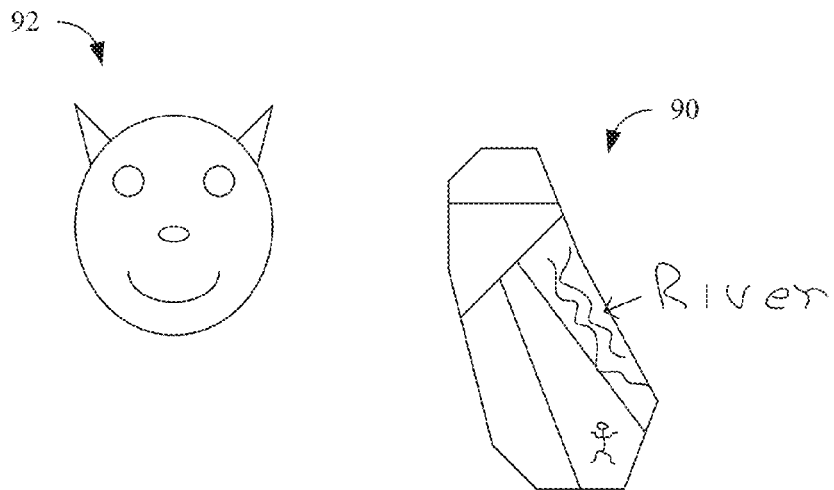
FIG. 6 is an illustration of an example of an avatar-based touch screen implementation according to an embodiment.

FIG. 6 demonstrates that touch screen content 90 may be combined with an avatar animation 92 that is generated based on a plurality of avatar images associated with facial motion data and an audio signal associated with the video signal, as already described. While the illustrated avatar animation 92 is two-dimensional (2D), three-dimensional (3D) animations may also be used.

Figure 7:
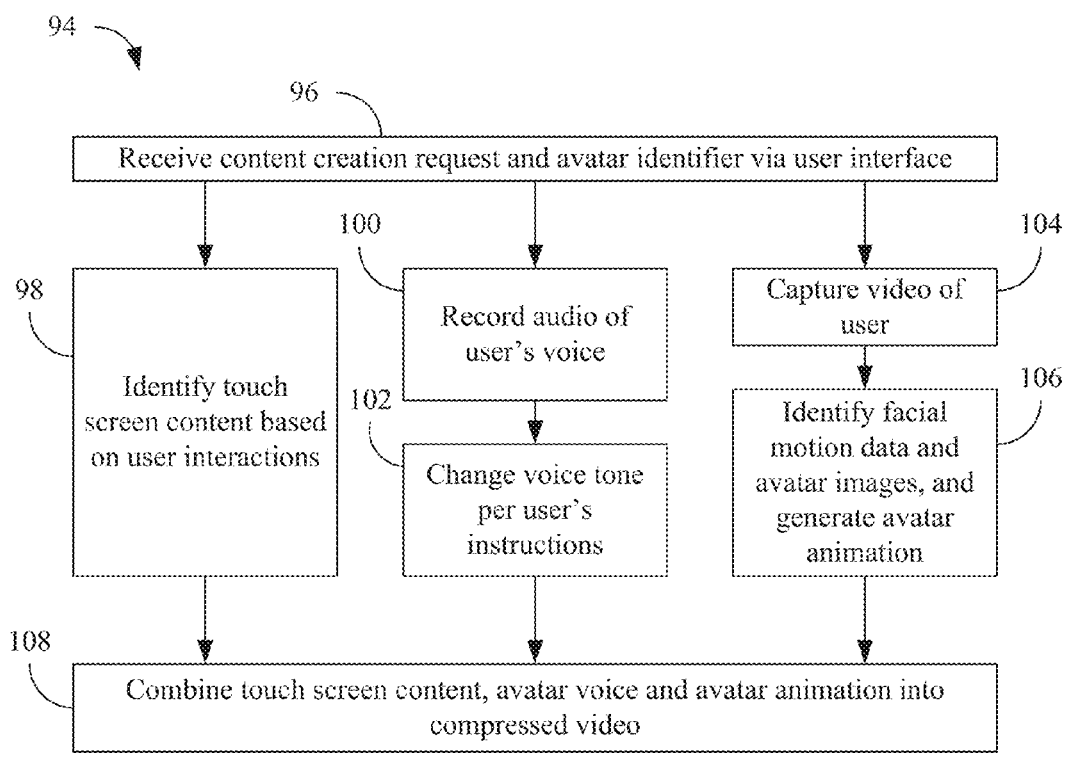
FIG. 7 is a flowchart of an example of a method of implementing an avatar-based touch screen solution according to an embodiment.

FIG. 7 shows a method 94 of implementing an avatar-based touch screen application. The method 94 may be implemented as a set of logic instructions and/or firmware stored in a machine- or computer-readable medium such as RAM, ROM, PROM, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated processing block 96 provides for receiving a content creation request and an avatar identifier via a user interface. Touch screen content may be identified at block 98 based on one or more user interactions. The user interactions may include finger touches, stylis touches, swipes, taps, and so forth. Audio of the user's voice may be recorded at block 100, wherein block 102 may change the voice tone of the recorded audio according to the user's instructions. Additionally, illustrated block 104 captures a video of the user, wherein facial motion data and a plurality of avatar images may be identified at block 106. Block 106 may also provide for generating an avatar animation. Illustrated block 108 combines the touch screen content, the avatar voice and the avatar animation into a compressed video.

Figure 8A:
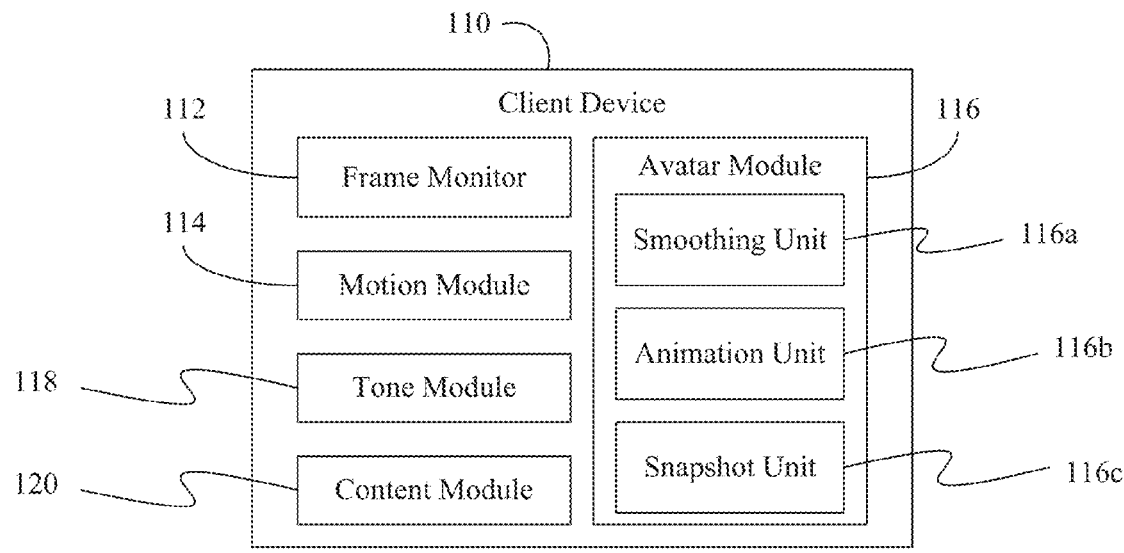
FIGS. 8A and 8B are block diagrams of examples of a client device and a server, respectively, according to embodiments.

Turning now to FIG. 8A a client device 110 is shown in which a frame monitor 112 detects conditions with respect to frames of a video signal associated with a set of facial motion data. The conditions may include, for example, one or more of a buffer overflow condition and a tracking failure condition. In addition, a motion module 114 may modify, in response to the conditions, the set of facial motion data to indicate that one or more frames lack facial motion data, wherein an avatar module 116 (116a-116c) may initiate an avatar animation based on the modified set of facial motion, data.

In one example, the avatar module 116 includes a smoothing unit 116a to apply a smoothing process to the one or more frames to obtain replacement facial motion data for the one or more frames. Moreover, a snapshot unit 116c may identify a plurality of avatar images based on the modified set of facial motion data and the replacement facial motion data. The illustrated avatar module 116 also includes an animation unit 116b to generate the avatar animation based on the plurality of avatar images and an audio signal associated with the video signal. Alternatively, the avatar module 116 may send the modified set of facial motion data and the audio signal to a remote server for generation of the replacement facial motion data and/or avatar animation.

The client device 110 may also include a tone module 118 to identify a voice tone setting based on user input, wherein the avatar module 116 may send the voice tone setting to the remote server for inclusion with a social networking message or other type of message. The illustrated client device 110 also includes a content module 120 to combine the touch screen content with the avatar animation obtained by the avatar module 116.

Figure 8B:
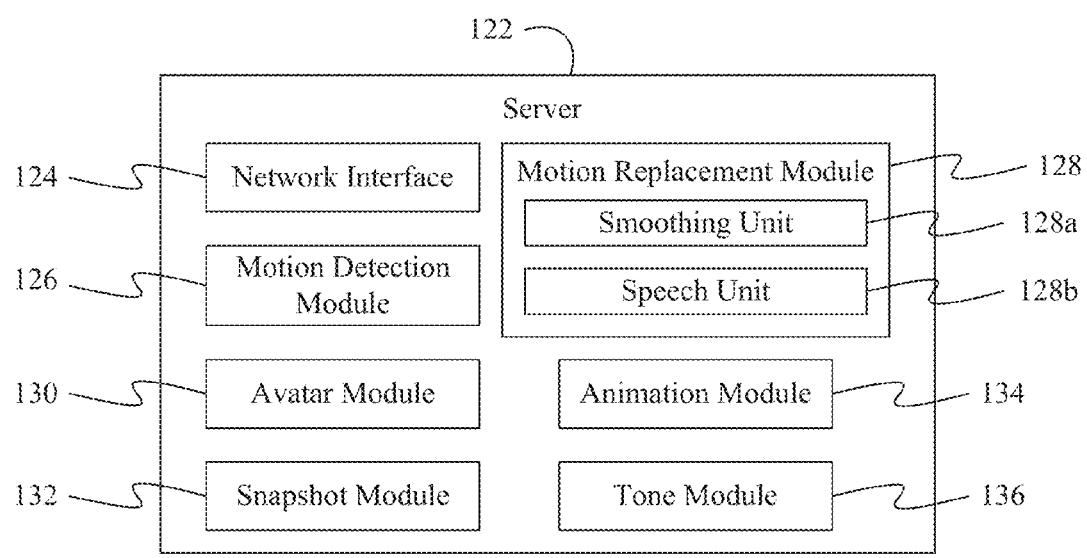

FIG. 8B shows a server 122 in which a network interface 124 receives a set of facial motion data associated with a video signal and a motion detection module 126 detects an indication in the set of facial motion data that one or more frames of the video signal lack facial motion data. A motion replacement module 128 (128a, 128b) may generate replacement facial motion data for the one or more frames and an avatar module 130 may initiate an avatar animation based on the set of facial motion data and the replacement facial motion data. In one example, the motion replacement module 128 includes a smoothing unit 128a to conduct a smoothing process on the facial motion data and a speech unit 128b to conduct a speech recognition process on the facial motion data.

Additionally, the server 122 may include a snapshot module 132 to identify a plurality of avatar images based on the set of facial motion data and the replacement facial motion data, and an animation module 134 to generate an avatar animation based on the plurality of avatar images and an audio signal associated with the video signal. The illustrated server 122 also includes a tone module 136 to receive an audio signal associated with the video signal, receive a voice tone setting, and translate the audio signal to an avatar voice based on the voice tone setting, wherein the avatar animation is to be initiated further based on the avatar voice.

Figure 9:
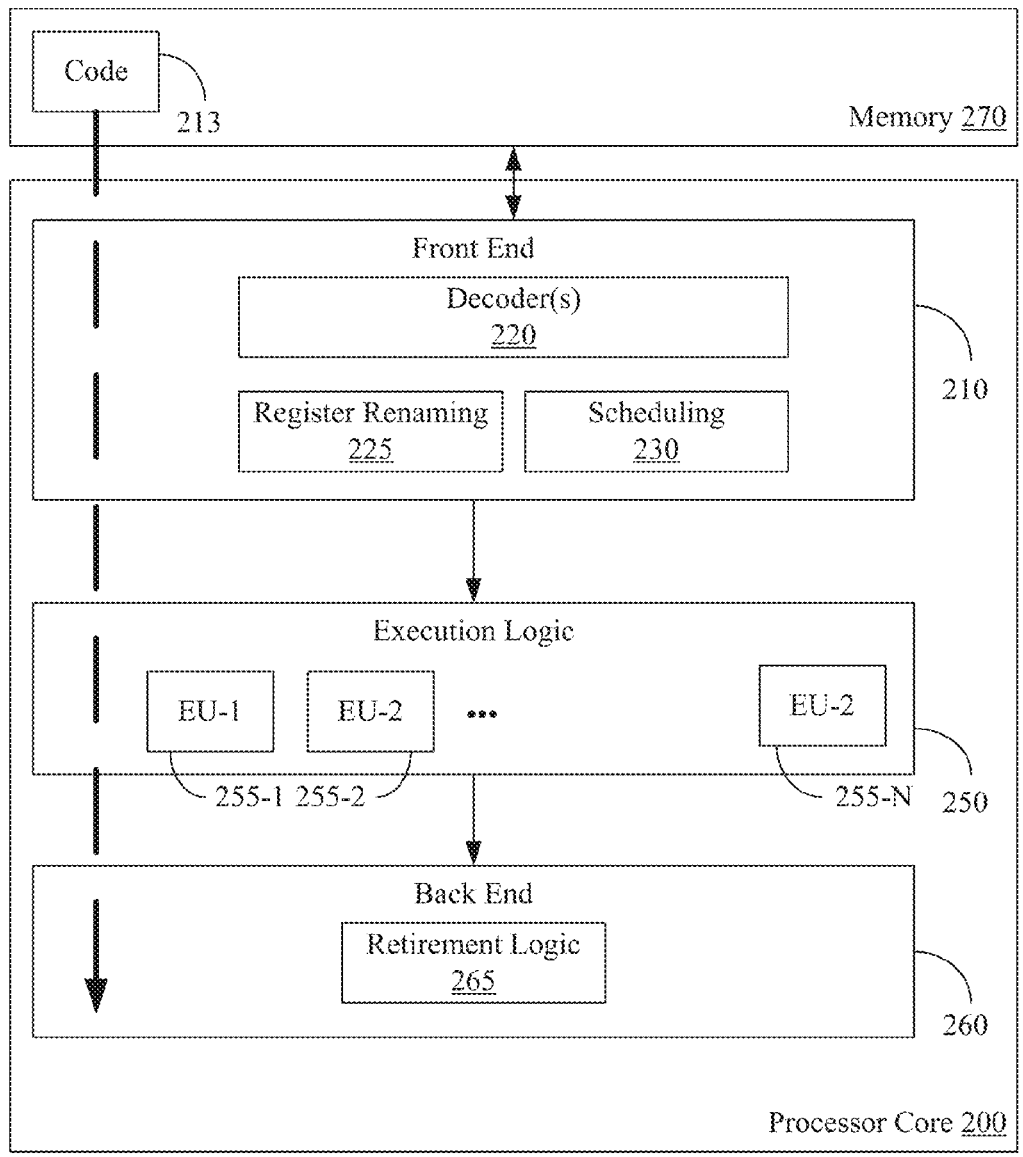
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction (s) to be executed by the processor 200 core, wherein the code 213 may implement the method 36 (FIG. 3), the method 62 (FIG. 5) and/or the method 94 (FIG. 7), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 10, shown is a block diagram of a system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., cameras) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 36 (FIG. 3), the method 62 (FIG. 5) and/or the method 94 (FIG. 7), and may be similar to the code 213 (FIG. 9), already discussed. Further, an audio I/O 1024 may be coupled to second bus 1020, wherein the audio I/O 1024 may be used to establish a headset connection.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

Additional Notes and Examples

Example 1 may include an apparatus to animate avatars, wherein the apparatus has a frame monitor to detect a condition with respect to one or more frames of a video signal associated with a set of facial motion data. The apparatus may also have a motion module to modify, in response to the condition, the set of facial motion data to indicate that the one or more frames lack facial motion data. Additionally, the apparatus may have an avatar module to initiate an avatar animation based on the modified set of facial motion data.

Example 2 may include the apparatus of example 1, wherein the condition is to be one or more of a buffer overflow condition and a tracking failure condition.

Example 3 may include the apparatus of example 1, wherein the avatar module further includes a smoothing module to apply a smoothing process to the one or more frames to obtain replacement facial motion data for the one or more frames, a snapshot module to identify a plurality of avatar images based on the modified set of facial motion data and the replacement facial motion data, and an animation module to generate the avatar animation based on the plurality of avatar images and an audio signal associated with the video signal.

Example 4 may include the apparatus of any one of examples 1 to 3, wherein the avatar module is to send the modified set of facial motion data and an audio signal associated with the video signal to a remote server.

Example 5 may include the apparatus of example 4, further including a tone module to identify a voice tone setting based on user input, wherein the avatar module is to send the voice tone setting to the remote server.

Example 6 may include the apparatus of any one of examples 1 to 3, further including a snapshot module to identify a plurality of avatar images based on the modified set of facial motion data, an animation module to generate the avatar animation based on the plurality of avatar images and an audio signal associated with the video signal, and a content module to combine touch screen content with the avatar animation.

Example 7 may include at least one computer readable storage medium having a set of instructions which, if executed by a client device, cause the client device to detect a condition with respect to one or more frames of a video signal associated with a set of facial motion data. The instructions, if executed, may also cause the client device to modify, in response to the condition, the set of facial motion data to indicate that the one or more frames lack facial motion data, and initiate an avatar animation based on the modified set of facial motion data.

Example 8 may include the at least one computer readable storage medium of example 7, wherein the condition is to be one or more of a buffer overflow condition and a tracking failure condition.

Example 9 may include the at least one computer readable storage medium of example 7, wherein the instructions, if executed, cause the client device to apply a smoothing process to the one or more frames to obtain replacement facial motion data for the one or more frames, identify a plurality of avatar images based on the modified set of facial motion data and the replacement facial motion data, and generate the avatar animation based on the plurality of avatar images and an audio signal associated with the video signal.

Example 10 may include the at least one computer readable storage medium of any one of examples 7 to 9, wherein the instructions, if executed, cause the client device to send the modified set of facial motion data and an audio signal associated with the video signal to a remote server.

Example 11 may include the at least one computer readable storage medium of example 10, wherein the instructions, if executed, cause the client device to identify a voice tone setting based on user input, and send the voice tone setting to the remote server.

Example 12 may include the at least one computer readable storage medium of any one of examples 7 to 9, wherein the instructions, if executed, cause the client device to identify a plurality of avatar images based on the modified set of facial motion data, generate the avatar animation based on the plurality of avatar images and an audio signal associated with the video signal, and combine touch screen content with the avatar animation.

Example 13 may include a method of animating avatars, comprising detecting a condition with respect to one or more frames of a video signal associated with a set of facial motion data, modifying, in response to the condition, the set of facial motion data to indicate that the one or more frames lack facial motion data, and initiating an avatar animation based on the modified set of facial motion data.

Example 14 may include the method of example 13, wherein the condition is one or more of a buffer overflow condition and a tracking failure condition.

Example 15 may include the method of example 13, further including applying a smoothing process to the one or more frames to obtain replacement facial motion data for the one or more frames, identifying a plurality of avatar images based on the modified set of facial motion data and the replacement facial motion data, and generating the avatar animation based on the plurality of avatar images and an audio signal associated with the video signal.

Example 16 may include the method of any one of examples 13 to 15, wherein initiating the avatar animation includes sending the modified set of facial motion data and an audio signal associated with the video signal to a remote server.

Example 17 may include the method of example 16, further including identifying a voice tone setting based on user input, and sending the voice tone setting to the remote server.

Example 18 may include the method of any one of examples 13 to 15, further including identifying a plurality of avatar images based on the modified set of facial motion data, generating the avatar animation based on the plurality of avatar images and an audio signal associated with the video signal, and combining touch screen content with the avatar animation.

Example 19 may include a method of animating avatars including receiving a set of facial motion data associated with a video signal, detecting an indication in the set of facial motion data that one or more frames of the video signal lack facial motion data, generating replacement facial motion data for the one or more frames, and initiating an avatar animation based on the set of facial motion data and the replacement facial motion data.

Example 20 may include the method of example 19, further including identifying a plurality of avatar images based on the set of facial motion data and the replacement facial motion data, and generating an avatar animation based on the plurality of avatar images and an audio signal associated with the video signal.

Example 21 may include the method of example 19, further including receiving an audio signal associated with the video signal, receive a voice tone setting, and translating the audio signal to an avatar voice based on the voice tone setting, wherein the avatar animation is to be initiated further based on the avatar voice.

Example 22 may include the method of example 21, wherein the instructions, if executed, cause a server to stream the set of facial motion data and the avatar voice to a social networking recipient.

Example 23 may include the method of any one of examples 19 to 22, wherein the replacement facial motion data is generated based on one or more of a smoothing process and a speech recognition process.

Example 24 may include an apparatus to animate avatars, comprising means for performing the method of any one of examples 13 to 23.

Example 25 may include at least one computer readable storage medium having a set of instructions which, if executed by a server, cause the server to perform the method of any one of examples 19 to 23.

Example 26 may include a method of animating avatars comprising applying a smoothing process to one or more frames to obtain replacement facial motion data for the one or more frames, identifying a plurality of avatar images based on a modified set of facial motion data and the replacement facial motion data, and generating an avatar animation based on the plurality of avatar images and an audio signal associated with the video signal.

Example 27 may include a method of animating avatars comprising identifying a plurality of avatar images based on a modified set of facial motion data, generating an avatar animation based on the plurality of avatar images and an audio signal associated with the video signal, and combining touch screen content with the avatar animation.

Example 28 may include at least one computer readable storage medium having a set of instructions which, if executed by a server, cause the server to perform the method of any one of examples 27 or 28.

Example 29 may include an apparatus to animate avatars, comprising means for conducting the method of any one of examples 27 or 28.

Techniques described herein may therefore enable enhanced quality with respect to avatar animations generated via mobile devices having relatively low performance processors. Moreover, these techniques may be readily extended to handheld device-based applications such as social networking applications and touch screen applications.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus to animate avatars, comprising:
a frame monitor, implemented as least partly in one or more of configurable logic or fixed-functionality logic hardware, to detect a condition with respect to one or more frames of a video signal associated with a set of facial motion data related to an image capture of a face of one or more individuals;
a motion module, implemented as least partly in one or more of configurable logic or fixed-functionality logic hardware, to modify, in response to the condition, the set of facial motion data to indicate that the one or more frames of the video signal associated with the captured image of the one or more individuals lack facial motion data; and
an avatar module, implemented as least partly in one or more of configurable logic or fixed-functionality logic hardware, to initiate an avatar animation based on the modified set of facial motion data,
wherein frames located proximate to the frames lacking facial motion data are leveraged to compute replacement facial motion data for the frames lacking facial motion data.

2. The apparatus of claim 1, wherein the condition is to be one or more of a buffer overflow condition and a tracking failure condition.

3. The apparatus of claim 1, wherein the avatar module further includes:
a smoothing module, implemented as least partly in one or more of configurable logic or fixed-functionality logic hardware, to apply a smoothing process to the one or more frames to obtain the replacement facial motion data for the one or more frames;
a snapshot module, implemented as least partly in one or more of configurable logic or fixed-functionality logic hardware, to identify a plurality of avatar images based on the modified set of facial motion data and the replacement facial motion data; and
an animation module, implemented as least partly in one or more of configurable logic or fixed-functionality logic hardware, to generate the avatar animation based on the plurality of avatar images and an audio signal associated with the video signal.

4. The apparatus of claim 1, wherein the avatar module is to send the modified set of facial motion data and an audio signal associated with the video signal to a remote server.

5. The apparatus of claim 4, further including a tone module, implemented as least partly in one or more of configurable logic or fixed-functionality logic hardware, to identify a voice tone setting based on a user input, wherein the avatar module is to send the voice tone setting to the remote server.

6. The apparatus of claim 1, further including:
a snapshot module, implemented as least partly in one or more of configurable logic or fixed-functionality logic hardware, to identify a plurality of avatar images based on the modified set of facial motion data;
an animation module, implemented as least partly in one or more of configurable logic or fixed-functionality logic hardware, to generate the avatar animation based on the plurality of avatar images and an audio signal associated with the video signal; and
a content module, implemented as least partly in one or more of configurable logic or fixed-functionality logic hardware, to combine touch screen content with the avatar animation.

7. At least one non-transitory computer readable storage medium comprising a set of instructions which, if executed by a client device, cause the client device to:
detect a condition with respect to one or more frames of a video signal associated with a set of facial motion data related to an image capture of a face of one or more individuals;
modify, in response to the condition, the set of facial motion data to indicate that the one or more frames of the video signal associated with the captured image of the one or more individuals lack facial motion data; and
initiate an avatar animation based on the modified set of facial motion data,
wherein frames located proximate to the frames lacking facial motion data are leveraged to compute replacement facial motion data for the frames lacking facial motion data.

8. The at least one non-transitory computer readable storage medium of claim 7, wherein the condition is to be one or more of a buffer overflow condition and a tracking failure condition.

9. The at least one non-transitory computer readable storage medium of claim 7, wherein the instructions, if executed, cause the client device to:
apply a smoothing process to the one or more frames to obtain the replacement facial motion data for the one or more frames;
identify a plurality of avatar images based on the modified set of facial motion data and the replacement facial motion data; and
generate the avatar animation based on the plurality of avatar images and an audio signal associated with the video signal.

10. The at least one non-transitory computer readable storage medium of claim 7, wherein the instructions, if executed, cause the client device to send the modified set of facial motion data and an audio signal associated with the video signal to a remote server.

11. The at least one non-transitory computer readable storage medium of claim 10, wherein the instructions, if executed, cause the client device to:
identify a voice tone setting based on a user input; and
send the voice tone setting to the remote server.

12. The at least one non-transitory computer readable storage medium of claim 7, wherein the instructions, if executed, cause the client device to:
identify a plurality of avatar images based on the modified set of facial motion data;
generate the avatar animation based on the plurality of avatar images and an audio signal associated with the video signal; and
combine touch screen content with the avatar animation.

13. A method to animate avatars, comprising:
detecting, by a mobile communication device, a condition with respect to one or more frames of a video signal associated with a set of facial motion data related to an image capture of a face of one or more individuals;
modifying, by the mobile communication device, and in response to the condition, the set of facial motion data to indicate that the one or more frames of the video signal associated with the captured image of the one or more individuals lack facial motion data; and
initiating, by one or more of the mobile communication device and a remote server, an avatar animation based on the modified set of facial motion data,
wherein frames located proximate to the frames lacking facial motion data are leveraged to compute replacement facial motion data for the frames lacking facial motion data.

14. The method of claim 13, wherein the condition is one or more of a buffer overflow condition and a tracking failure condition.

15. The method of claim 13, further including:
applying a smoothing process to the one or more frames to obtain the replacement facial motion data for the one or more frames;
identifying a plurality of avatar images based on the modified set of facial motion data and the replacement facial motion data; and
generating the avatar animation based on the plurality of avatar images and an audio signal associated with the video signal.

16. The method of claim 13, wherein initiating the avatar animation includes sending the modified set of facial motion data and an audio signal associated with the video signal to a remote server.

17. The method of claim 16, further including:
identifying a voice tone setting based on a user input; and
sending the voice tone setting to the remote server.

18. The method of claim 13, further including:
identifying a plurality of avatar images based on the modified set of facial motion data;
generating the avatar animation based on the plurality of avatar images and an audio signal associated with the video signal; and
combining touch screen content with the avatar animation.

19. At least one non-transitory computer readable storage medium comprising a set of instructions which, if executed by a server, cause the server to:

receive a set of facial motion data related to an image capture of a face of one or more individuals, and associated with a video signal;

detect an indication in the set of facial motion data that one or more frames of the video signal associated with the captured image of the one or more individuals lack facial motion data;

generate replacement facial motion data for the one or more frames; and initiate an avatar animation based on the set of facial motion data and the replacement facial motion data, wherein frames located proximate to the frames lacking facial motion data are leveraged to compute the replacement facial motion data for the frames lacking facial motion data.

20. The at least one non-transitory computer readable storage medium of claim 19, wherein the instructions, if executed, cause a server to:

identify a plurality of avatar images based on the set of facial motion data and the replacement facial motion data; and generate an avatar animation based on the plurality of avatar images and an audio signal associated with the video signal.

21. The at least one non-transitory computer readable storage medium of claim 19, wherein the instructions, if executed, cause a server to:

receive an audio signal associated with the video signal;

receive a voice tone setting; and translate the audio signal to an avatar voice based on the voice tone setting, wherein the avatar animation is to be initiated further based on the avatar voice.

22. The at least one non-transitory computer readable storage medium of claim 21, wherein the instructions, if executed, cause a server to stream the set of facial motion data and the avatar voice to a social networking recipient.

23. The at least one non-transitory computer readable storage medium of claim 19, wherein the replacement facial motion data is to be generated based on one or more of a smoothing process and a speech recognition process.

* * * * *

UNITED STATES PATENT AND TRADEMARK OFFICE
CERTIFICATE OF CORRECTION

PATENT NO. : 9,460,541 B2
APPLICATION NO. : 13/997259
DATED : October 4, 2016
INVENTOR(S) : Li et al.

Page 1 of 1

It is certified that error appears in the above-identified patent and that said Letters Patent is hereby corrected as shown below:

On page 2, Column 2, Line 14, in the "Other Publications" section, delete "PCT/CN2012/00481" and insert -- PCT/CN2012/00461 --.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*